3,514,685
OPTICAL SPEED TRANSDUCER
Thomas H. Burgess, Little Rock, Ark., assignor to Fan Tron Corporation, Little Rock, Ark., a corporation of Arkansas
Filed Apr. 24, 1967, Ser. No. 633,082
Int. Cl. H02p 5/34
U.S. Cl. 318—313          12 Claims

ABSTRACT OF THE DISCLOSURE

A control circuit incorporating an optical scanning device for controlling the speed of rotation of a dynamoelectric machine. The control circuit includes a disc mounted for rotation in response to the rotation of the dynamoelectric machine. The disc has one or more circular segmented elements disposed concentrically thereon and associated with a light source and a photocell to generate pulse signal information indicative of the speed of rotation of the dynamoelectric machine and indicative of the number of segments within the segmented elements. The pulse signal information is delivered to a solid state circuit which includes a one-shot multivibrator for generating pulses having a fixed pulse width but having a variable repetition rate, which rate varies in accordance with the frequency of the pulse signal information, and a detector circuit for developing a direct current voltage responsive to the repetition rate of the square wave pulses. The solid state circuit also includes a unijunction oscillator circuit for generating control signal oscillations which are used to render a pair of silicon controlled rectifiers alternately conductive thereby energizing the dynamoelectric machine.

BACKGROUND OF THE INVENTION

Field of the invention

This invention relates generally to control circuits for controlling the speed of rotation of dynamoelectric machines, and more particularly to control circuits for controlling the speed of rotation of electric motors. Specifically, the present invention is directed to a control circuit which is capable of accurately controlling the speed of rotation of AC motors of the resistance split phase, capacitor start, permanent split capacitor, two-valued capacitor and shaded pole type.

Description of the prior art

Heretofore, control circuits have been employed to control the speed of rotation of DC or universal motors. However, such control circuits are found to be ineffective in accurately controlling the speed of rotation of AC motors. For example, control circuits of the prior art usually incorporate a single control element, such as a silicon controlled rectifier, which is rendered conductive during only half cycles of the applied AC signal. Therefore, only DC or universal motors are suitable for control by such control circuits.

One method of controlling the speed of rotation of an AC type motor is to utilize a tachometer generator or alternator connected to the motor to produce a variable frequency output say, for example, from 20 to 100 cycle. This frequency variation is used to change the speed of the motor.

SUMMARY OF THE INVENTION

Therefore, one of the primary objects of the present invention is to provide a motor control circuit for AC type motors which will maintain a preselected speed of the motor during variations of motor load.

Another object of the present invention is to provide a motor speed control circuit which will accurately maintain a fixed preselected motor speed, particularly low speeds, as for example 50 r.p.m. or less.

Another object of the present invention is to provide a motor speed control which is capable of being switched between several preselected motor speeds.

Yet another object of the present invention is to provide a motor speed control which while having the ability of selecting one of several preselected speeds, the motor speed control also includes means for continuously varying the speed of the motor between two selected speeds.

Still another object of the present invention is to provide a motor speed control which can be built into the housing of a motor or can be packaged to be adapted to an AC motor already in use.

Another object of the present invention is to provide a motor speed control which is efficient, easy to manufacture, and has a long life expectancy.

A feature of the present invention is the use of an optical speed sensing arrangement for sensing the actual speed of rotation of the motor to produce pulse signal information which, in turn, is used to generate control signal oscillations which is used to control the amount of power delivered to the motor and maintain the motor speed at a predetermined selected speed.

Briefly, the optical speed transducer of the present invention incorporates two masks. One of the masks is formed on a rotating disc, and the other mask is formed on a fixed member positioned closely adjacent to the rotating disc. The rotating disc, in effect, forms a tone wheel which acts as a light chopper coupled to a photocell. The rotatable disc may have one or more concentric segmented elements, each element having a different number of light transparent portions, and the ratio of the fixed preselected speeds available from the motor speed control is the ratio of the number of segments in any one segmented element to the number of segments in any other one of the segmented elements.

Pulse signal information indicative of motor speed is generated by the rotating disc and its associated photocell and delivered to a common emitter amplifier. The pulse signal information from the amplifier is then delivered to a monostable or one-shot multivibrator which produces pulses having a fixed pulse duration regardless of repetition rate, but whose repetition varies in accordance with the frequency of the pulse signal information. The square wave pulses are then fed to a common emitter amplifier and therefrom to a detector and integrator circuit to develop a direct current voltage the amplitude of which is dependent upon the number of pulses appearing at the output of the one-shot multivibrator. The direct current voltage is then delivered to a differential amplifier which compares the direct current voltage with a reference voltage thereby producing an error signal when the motor speed is different than the desired speed. The error signal is then delivered to a common emitter amplifier which, in turn, controls the rate of change of a capacitor thereby controlling the frequency of oscillations of a unijunction transistor oscillator circuit. The oscillator circuit develops control signal oscillations in response to the charge on the capacitor and in response to half-wave 120 cycle pulses applied to the bases of the unijunction transistor. The 120 cycle pulses are derived from full wave rectification of the 60 cycle line voltage. The control signal oscillations are then used to alternately render a pair of silicon controlled rectifiers conductive. The silicon controlled rectifiers are connected in parallel but in opposite conductive polarity and in series with the AC motor. Therefore, the AC motor receives energizing current during alternate half cycles of an AC applied voltage.

BRIEF DESCRIPTION OF THE DRAWINGS

FIG. 3 illustrates a portion of a rotatable disc having three segmented elements formed thereon;

FIG. 4 shows an edge view of the rotatable disc of FIG. 3 positioned adjacent a stationary mask, and between a light source and a photocell;

FIG. 5 is a schematic diagram of a detector circuit which can be substituted for the detector circuit in the schematic of FIG. 2;

FIG. 6 is a schematic diagram of an alternate arrangement of a triggering circuit for the silicon controlled rectifiers of FIG. 2; and FIG. 7 is a diagrammatic representation of a control circuit constructed in accordance with the principles of this invention and adapted to be connected to an existing AC motor.

DESCRIPTION OF THE PREFERRED EMBODIMENTS

Figure 1:
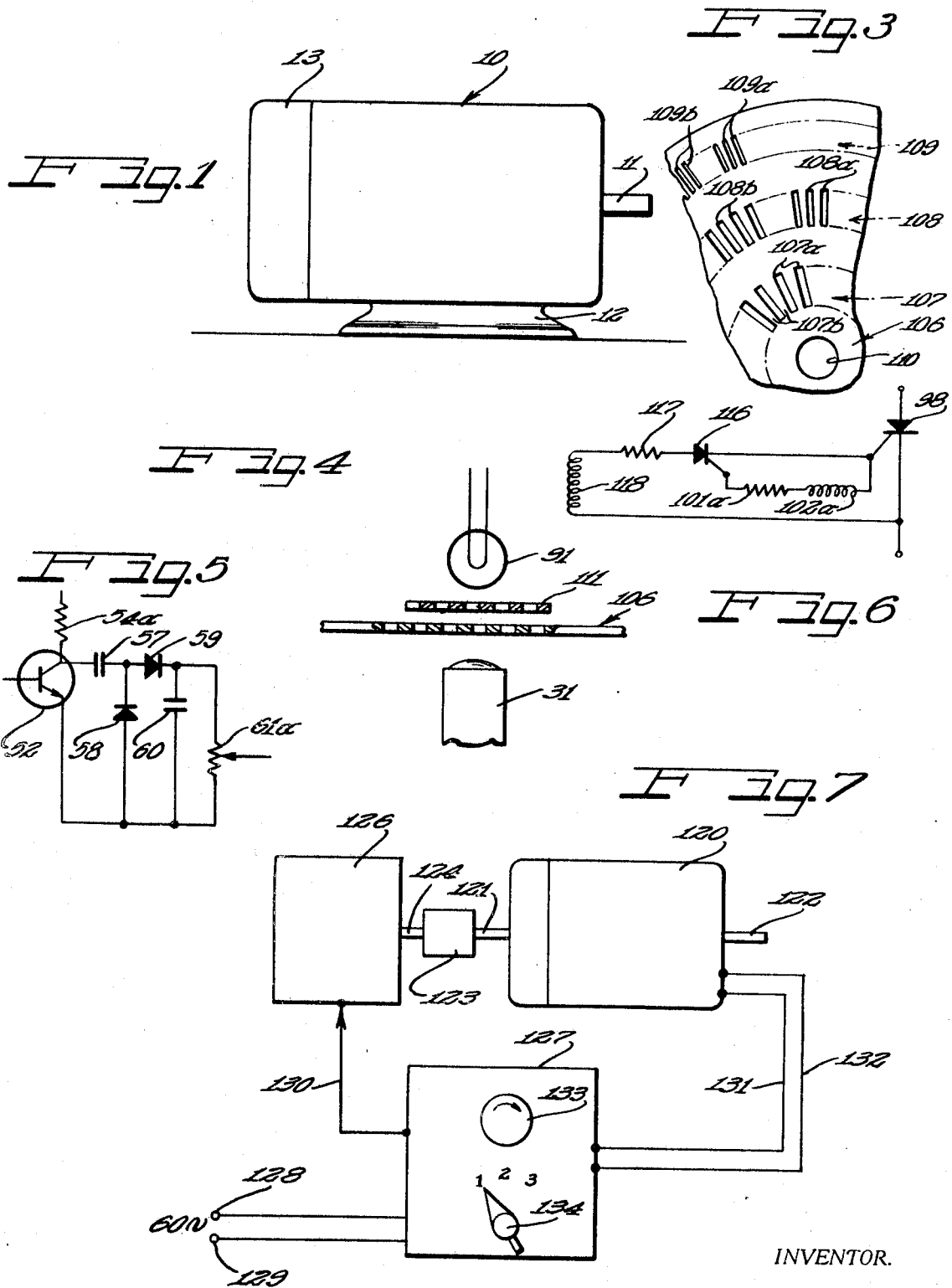
FIG. 1 illustrates an AC motor of the type to be controlled by the motor control circuit of the present invention.

Seen in FIG. 1 is an AC motor 10 which is to be controlled by the speed control circuit of the present invention. The motor 10 may be either a resistance split phase, capacitor start, permanent split capacitor, two-valued capacitor or shaded pole type. The motor 10 includes an output shaft 11 which may be coupled to mechanism to produce work thereon. A base 12 is secured to the motor 10, and an end cover 13 is secured to the motor opposite the output shaft 11. The end cover 13 may contain the capacitors, for the capacitor type motors, and also contain the motor speed control circuit of the present invention.

The motor speed control circuit of the present invention may be mounted on a printed circuit board and fixedly secured within the housing of the motor 10 or within the confines of the end cap 13.

Figure 2:
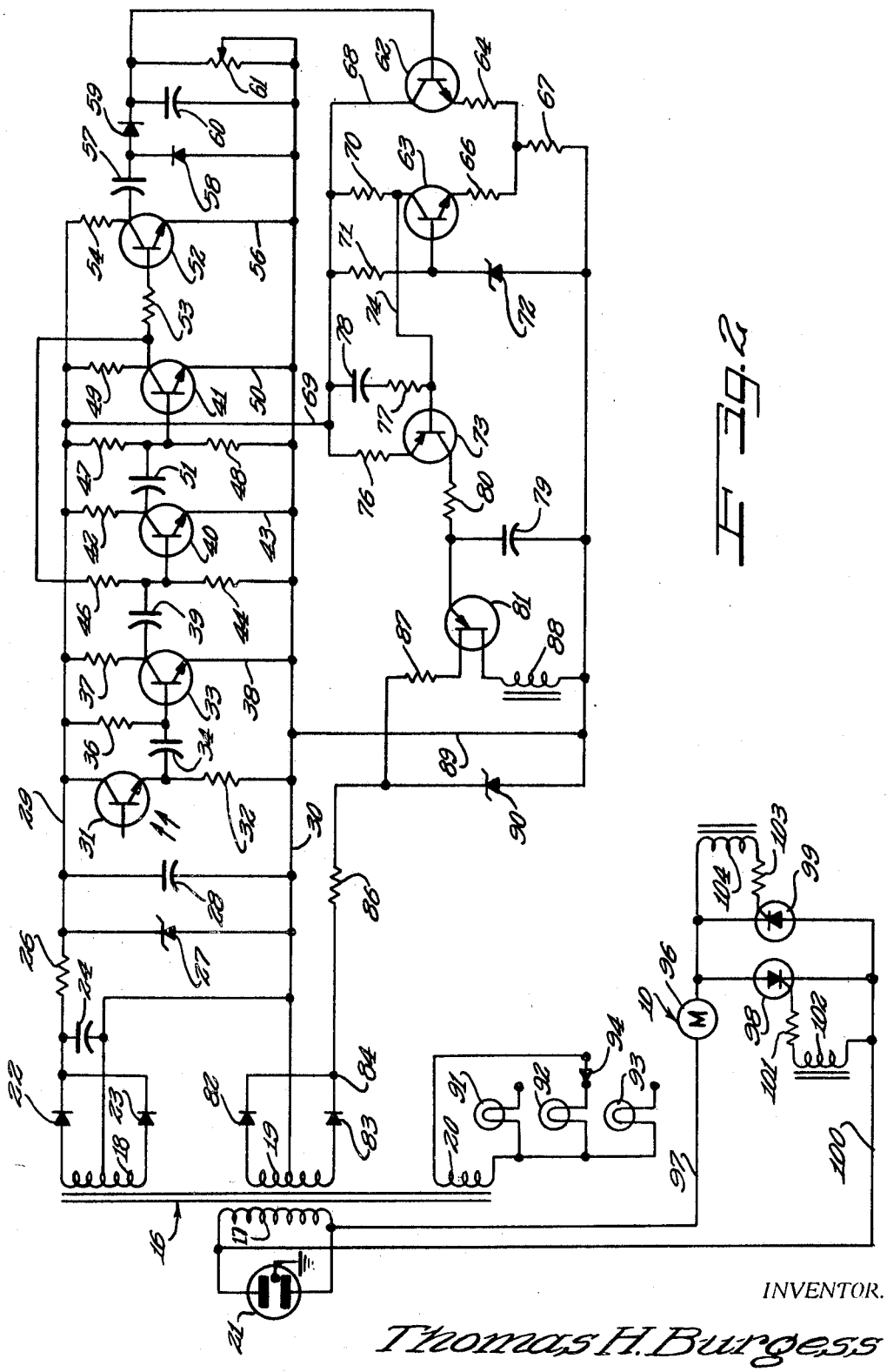
FIG. 2 is a schematic diagram of the motor control circuit of the present invention.

As seen in FIG. 2, the motor speed control circuit of the present invention includes a transformer 16 having a primary winding 17 and three secondary windings 18, 19 and 20. The primary winding 17 is adapted to a plug 21 which, in turn, may be plugged into a source of alternating current voltage, for example a 60 cycle power line source.

A rectifier and filter circuit comprising diodes 22 and 23, a capacitor 24 and a resistor 26 are connected to the secondary winding 18 for developing therefrom a direct current potential to operate the motor control circuit. The direct current potential developed by the rectifier and filter circuit is regulated by means of a Zener diode 27 and a charging capacitor 28. Connected to opposite ends of the parallel connected Zener diode and capacitor 27 and 28 respectively is a pair of potential feed lines 29 and 30.

A photocell 31 has one terminal thereof connected to the line 29 and the other terminal thereof connected to the line 30 through a resistor 32. The photocell 31 is preferably of the fast acting phototransistor type. Light pulses, generated in response to the speed of rotation of the shaft 11 of the motor 10, are sensed by the photocell 31. Therefore, the photocell 31 generates pulse signal information indicative of motor speed. The pulse signal information so generated by the photocell 31 is delivered to a common emitter amplifier transistor 33 through a capacitor 34. A biasing resistor 36 is connected between the line 29 and the base electrode of the transistor 33. The collector electrode of the transistor 33 is connected to the line 29 hrough a resistor 37, and the emitter electrode of the transistor 33 is connected to the line 30 through a line 38.

The amplified pulse signal information from the transistor 33 is then delivered through a capacitor 39 to a one-shot multivibrator circuit. The multivibrator circuit is formed by a pair of transistors 40 and 41. The collector electrode of the transistor 40 is connected through a resistor 42 to the line 29, and the emitter electrode thereof is connected to the line 30 through a line 43. The base of the transistor 40 is connected to the line 30 through a resistor 44 and to the collector of the transistor 41 through a resistor 46. Therefore, the output of transistor 41 is direct current coupled to the input of the transistor 40. The base of the transistor 41 is connected to the center of a voltage divider network comprising resistors 47 and 48 which, in turn, are connected to lines 29 and 30 respectively. Also, connected to the center of the voltage divider network is one end of a capacitor 51. The other end of the capacitor 51 is connected to the collector electrode of the transistor 40. Therefore, the output of the transistor 40 is capacitive-coupled to the input of the transistor 41. The multivibrator circuit, comprising transistors 40 and 41, develops square wave pulses having a fixed pulse duration but having a variable pulse repetition rate. The repetition rate varies in accordance with the pulse signal information generated by the photocell 31.

The square wave pulses developed by the multivibrator are delivered to a common emitter amplifier transistor 52 through a resistor 53. The collector electrode of the transistor 52 is connected to the line 29 through a resistor 54, and the emitter electrode of the transistor 52 is connected to the line 30 through a line 56. The amplified square wave pulses are then delivered to a detector circuit through a capacitor 57.

The detector circuit comprises a pair of diodes 58 and 59 which rectify the square wave pulses and charge a capacitor 60. Connected in parallel with the capacitor 60 is a variable resistor 61. The resistor 61 serves to vary the RC time constant of the charging capacitor thereby setting the level of the direct current voltage developed across the capacitor by the diodes 58 and 59.

The direct current voltage developed by the detector circuit is delivered to a differential amplifier stage consisting of transistors 62 and 63. The emitter of the transistor 62 is connected to the emitter of the transistor 63 through a pair of resistors 64 and 66. The junction between the resistors 64 and 66 is connected to a resistor 67. Operating potential is applied to the transistor 62 through a line 68 which, in turn, is connected to the line 29 via a line 69. Also connected to the line 69 is the collector resistor 70 of the transistor 63. The base of the transistor 63 has connected thereto a resistor 71 and a Zener diode 72. The Zener diode 72 functions as a reference voltage potential for the differential amplifier circuit. The reference potential developed by the Zener diode 72 is compared with the direct current voltage developed by the detector circuit.

The output of the differential amplifier circuit, developed across transistor 63, is delivered to a transistor 73 through a line 74. The emitter of the transistor 73 is connected through a resistor 76 and the line 69 to the line 29, while the base of the transistor 73 is connected to the line 69 through a resistor 77 and a capacitor 78. The collector of the transistor 73 is connected to a charging capacitor 79 through a resistor 80. The conduction of the transistor 73 through the resistor 80 controls the charge rate of the capacitor 79, which rate is proportional to the value of the direct current voltage developed across the capacitor 60.

The charge on the capacitor 79 is applied to the emitter of a unijunction transistor 81 which together with the charging capacitor 79 form a relaxation oscillator. The relaxation oscillator circuit generates control signal oscillations which are developed in synchronism with the applied AC line voltage to control the conduction of current through the motor 10.

The unijunction transistor 81 receives 120 cycle pulses from a full wave rectifier circuit connected to the secondary winding 19. The full wave rectifier circuit includes a pair of diodes 82 and 83 having their cathodes connected together to a common circuit point 84. The 120 cycle pulses are delivered to the first base electrode of the unijunction transistor 81 through a pair of resistors 86 and 87. The second base electrode of the unijunction transistor 81 is connected to one end of a primary windings 88 of a pulse forming transformer. The other end of the primary winding 88 is connected to the line 30 through a line 89. Connected across the resistor 87, transistor 81 and primary winding 88 and in parallel therewith is a Zener diode 90 which serves as a voltage regulator for the oscillator circuit. That is, the Zener diode 90 limits the maximum amplitude of the 120 cycle pulses which are developed at the output of the full wave rectifier circuit. The secondary winding 20 serves as a power source for a plurality of incandescent lamps 91, 92 and 93. The incandescent lamps serve as a light source for energization of the photocell 31. The selector switch 94 may be provided to select the desired lamp to be energized.

Connected across the primary winding 17 is the energizing portion 96 of the motor 10. One end of the energizing portion 96 is connected to the primary winding 17 through a line 97, while the other end of the energizing portion 96 is connected to a pair of silicon controlled rectifiers 98 and 99. The silicon controlled rectifiers 98 and 99 are connected in parallel and in opposite conductive directions so as to allow AC current to pass through the energizing portion 96. The silicon controlled rectifiers 98 and 99 are connected to the primary winding 17 through a line 100.

The gate electrode of the silicon controlled rectifier 98 is connected to a resistor 101 and to a secondary winding 102 which is mutually coupled to the primary winding 88 of the pulse forming transformer. Similarly, the gate electrode of the silicon controlled rectifier 99 is connected to a resistor 103 and to a secondary winding 104 which is mutually coupled to the primary winding 88 of the pulse forming transformer. Therefore, the control signal oscillations generated by the unijunction transistor 81 during each half cycle of the applied AC signal is transformer coupled to the secondary windings 102 and 103 of the pulse forming transformer. However, only the silicon controlled rectifier, which is forward biased by the applied AC signal, will be rendered conductive to apply energizing current to the energizing portion 96 of the motor 10.

Seen in FIG. 3 is a disc 106 which has a plurality of segmented elements 107, 108 and 109 formed concentrically thereon. The segmented element 107 comprises alternate light transparent portions 107a and light blocking portions 107b. The segmented element 108 comprises alternate light transparent portions 108a and light blocking portions 108b. Similarly, the segmented element 109 comprises alternate light transparent portions 109a and light blocking portions 109b. The number of light transparent segments of the segmented element 107 is less than the number of light transparent segments in the segmented element 108. Similarly, the number of light transparent segments in the segmented element 108 is less than the number of light transparent segments in the segmented element 109. The disc 106 is provided with a central aperture 110 which allows the disc to be secured to the rotor shaft of the motor 10 within the cover 13, of FIG. 1. The disc 106 forms one of the important features of the present invention. As the disc 106 rotates, light, from one of the lamps 91–93 of FIG. 2, passes through the light transparent portions of a corresponding segmented element to produce light pulses thereby to correspondingly activate the photocell 31.

As seen in FIG. 4, the disc 106 is placed between the light source, for example the lamp 91, and the photocell 31. In the preferred embodiment of the present invention, a shadow mask 111 is positioned adjacent the disc 106 and between the lamp 91 and the photocell 31. The shadow mask also has alternate light transparent portions and light blocking portions. Therefore, when the light transparent portions of the disc are in alignment with the light transparent portions of the mask 111, light will pass through the light transparent portions of both the disc and the mask to impinge upon the photocell 31 thereby producing an electrical impulse. On the other hand, as the disc rotates and aligns the light blocking portions thereof with the light transparent portions of the mask 111, all of the light from the lamp 91 is blocked from the photocell 31. In effect, the amount of light which impinges upon the photocell 31 varies between 50% of the light directed toward the photocell by the lamp 91 to 0%. It is this light intensity variation which produces the pulse signal information to control the speed of the motor 10.

In operation, power from the transformer 16 will cause a direct current potential to be developed across the lines 29 and 30, while simultaneously applying 120 cycle full wave rectified pulses to the first base electrode of the unijunction transistor 81. During the initial operating condition of the control circuit, with the rotor of the motor stationary, there is no voltage charge on the capacitor 60. Therefore, the transistor 62 is maintained in a non-conductive state which, in turn, renders the transistor 63 conductive. The conduction of the transistor 63 is sensed by the transistor 73 through the line 74 thereby rendering the transistor 73 conductive to charge the capacitor 79 at a relatively high rate. The fast charge time of the capacitor 79, during the initial starting condition of the motor, will cause the unijunction transistor 81 to produce control signal oscillations early in each half cycle of the applied AC potential. The control signal oscillations are then transformer coupled to the secondary windings 102 and 104 of the pulse forming transformer to render either the silicon controlled rectifier 98 or 99 conductive, depending upon the polarity of the applied AC potential. The conduction of silicon controlled rectifiers 98 and 99 energize the motor 10 to cause rotation thereof.

As the rotor of the motor rotates so also does the disc 106, of FIG. 3, thereby producing light pulses from one of the lamps 91–93. The desired motor speed will depend on which lamp 92–93 is energized to transmit light to its associated segmented element. For example, the lamp 93 may be associated with the segmented element 109, the lamp 92 may be associated with the segmented element 108, and the lamp 91 may be associated with the segmented element 107. Also, it will be understood that the segmented element 107 represents the maximum preselected speed, the segmented element 108 represents an intermediate preselected speed, and the segmented element 109 represents the minimum preselected speed attainable by illumination of the associated lamps 91–93.

The pulses generated by the transistor photocell 31 are then applied to the common emitter amplifier transistor 33 whereupon the pulse signal information is delivered to transistors 40 and 41 which comprise a monostable or one-shot multivibrator. The multivibrator produces square wave pulses having a fixed on time and a variable repetition rate. The repetition rate of the square wave pulses is proportional to the frequency of the pulse signal information generated by the transistor photocell 31. The square wave pulses are then fed to the common emitter amplifier transistor 52 where the square wave pulses are amplified and delivered to the detector and integrator circuit comprising diodes 58 and 59 and capacitor 60. The capacitor 60 becomes charged to develop a direct current voltage thereacross. The value of the direct current voltage across the capacitor 60 may be varied by the potentiometer 61, thereby providing precise adjustment of the control circuit in accordance with the number of transparent segments in the segmented elements on the disc 106. Therefore, after the potentiometer 61 has been adjusted the ratio of the preselected speed corresponding to each of the segmented elements is equal to the ratio of transparent segments in each of the segmented elements.

The direct current voltage developed across capacitor 60 is then delivered to the base electrode of transistor 62 thereby rendering the transistor 62 conductive. The conduction of transistor 62 is proportional to the rotor speed of the motor and increases as the rotor speed increases. As mentioned hereinabove, the transistor 62 together with the transistor 63 form a differential amplifier stage which compares the direct current voltage developed across capacitor 60 with the fixed voltage developed by the Zener diode 72, at the base of the transistor 63. As the direct current voltage across capacitor 60 increases, so also does the conductivity of the transistor 62. This action will cause transistor 63 to become less conductive which, in turn, causes transistor 73 to become less conductive. The reduction in conduction of transistor 73 decreases the charge rate of capacitor 79 thereby decreasing the frequency of oscillation of the unijunction transistor 81. Therefore, as the rotor speed increases to the desired speed, the differential amplifier will cause capacitor 79 to charge at a rate sufficient only to maintain the rotor speed constant.

An important feature of the present invention is the fact that capacitor 79 charges in synchronism with the 120 cycle half wave pulses applied to the first base electrode of the unijunction transistor 81. The synchronized voltages applied to unijunction transistor 81 cause the transistor 81 to generate control signal oscillations in synchronism with the 120 cycle pulses but shifted in phase therewith in accordance with the charge rate on the capacitor 79. The unijunction transistor oscillator circuit of the present invention automatically insures that the control signal oscillations generated thereby are in synchronism with the 120 cycle pulses and shifted in phase the desired amount. This is accomplished by the fact that during each zero crossing of the applied 60 cycle AC current, the voltage applied to the first base electrode of the unijunction transistor 81 becomes less than the voltage developed across the capacitor 79 thereby firing the unijunction transistor 81 to discharge the capacitor 79 and place the capacitor 79 in condition for a subsequent charging period from the transistor 73.

It will be understood that the lamps 91–93 are positioned adjacent their respective segmented elements 107–109 of the disc 106 so as to cause light to shine through the segments of the elements dependent upon which lamp is energized. Therefore, the speed of the motor can be changed between a plurality of preselected speeds dependent upon which lamp is energized. Although the speed control circuit of the present invention discloses only three segmented elements associated with the disc 106, it will be understood that any number of segmented elements can be formed on the disc.

Seen in FIG. 5 is an alternate arrangement of the detector and integrator circuit of FIG. 2. The transistor 52 may be connected to a high voltage direct current source for operation therefrom. For example, the high voltage source may be 120 volts, and the resistor 54a may have a higher resistance than the resistor 54 of FIG. 2. Also, the movable contactor of the potentiometer 61a may serve as the output of the detector and integrator circuit. By utilizing the variable voltage output afforded by the potentiometer 61a, the amplitude of the direct current voltage may be varied thereby providing continuous variable speed control of the motor 10 between the predetermined fixed speeds developed by the segmented elements on the disc 106. Therefore, not only can the motor control circuit of the present invention provide a plurality of predetermined fixed speeds which can be individually selected to operate the motor 10, but also the motor can be operated at any speed in between the preselected speeds.

Seen in FIG. 6 is an alternate arrangement of a triggering circuit which is connected between the gate and cathode electrodes of the silicon controlled rectifier 98. It will be understood that the triggering circuit of FIG. 6 may also be used in the gate circuit of the silicon controlled rectifier 99. Connected to the gate electrode of the silicon controlled rectifier 98 is a silicon controlled rectifier 116 which, in turn, has connected to its gate electrode a resistor 101a and a secondary winding 102a of the pulse forming transformer. Connected to the anode of the silicon controlled rectifier 116 is a resistor 117 and a secondary winding 118. The secondary winding 118 is mutually coupled to the primary winding 17 of the transformer 16. Therefore, when the 60 cycle AC voltage is applied to the secondary winding 118 in the proper polarity to forward bias the silicon controlled rectifier 116, and a pulse indicative of control signal oscillations of the unijunction transistor 81 is applied to the secondary winding 102a, the silicon controlled rectifier 98 is rendered conductive and the gate circuit thereof is maintained in the on state for the entire duration of the half cycle applied thereto.

Seen in FIG. 7 is an arrangement whereby the motor speed control circuit of the present invention can be adapted to existing AC motors. For example, a motor 120 includes a rotatable shaft having one end 121 connected to the motor speed control of the present invention and the other end 122 adapted to drive any desired machine. The end 121 of the motor shaft is connected to a coupling 123 which, in turn, is connected to a shaft 124 extending from a housing 126. The housing 126 contains the rotatable disc 106 which is secured to the shaft 124 for rotation therewith. If desired, the entire speed control circuit shown in FIG. 2 may also be housed within the housing 126. Although the output shaft of the motor 120 is shown directly coupled to the shaft 124 of the control housing 126, this is not construed in a limiting sense. The output shaft of the motor 120 can be coupled to the shaft 124 by any suitable means, such as pulleys or gears.

An important feature of the control arrangement shown in FIG. 7 is the use of a remote control housing 127 which may also serve as the AC voltage distribution box. Therefore, the housing 127 is connected to a source of 60 cycle alternating current through a pair of terminals 128 and 129. A multiconductor cable 130 is connected between the remote control housing 127 and the housing 126 to provide electrical connections between the components in the respective housings. Also, power may be supplied to the motor 120 through a pair of lines 131 and 132 extending from the remote control housing 127.

The remote control housing 127 contains the potentiometer 61 which is adjustable by turning a knob 133. Also within the housing 127 is the selector switch 94 which may be positioned by selectively turning a knob 134. By placing the remote control housing 127 in a location convenient to access, complete control of motor speed can be accurately and easily obtained.

Another advantage of the present invention is that the photocell used is of the phototransistor type thereby being responsive to slight variations in light intensity. Therefore, the lamps 91–93 can be operated at less than their rated voltages thereby greatly increasing the life of the lamps which, in turn, increases the trouble-free operation of the motor control circuit. For example, by experimental evaluation, it has been determined that the lamps 91–93 may have a life expectancy of 10 years or more when operated at below rated voltages.

The component values of the circuit arrangement of FIG. 2 are as follows.

| Capacitor numbers: | Value |
|---|---|
| 24 | 50 mf., 50 v. |
| 28 | 100 mf., 25 v. |
| 34, 39 | 2 mf., 50 v. |
| 51 | .01 mf., 1 kv. |
| 57 | .47 mf., 12 v. |
| 78 | 100 mf., 15 v. |

| Diode numbers: | Type |
|---|---|
| 22, 23, 58, 59, 82, 83 | IN4003 |
| 27 | TZ15 (1 watt) |
| 72 | IN753 |
| 90 | TZ18 |

Transistor numbers:
| | |
|---|---|
| 33, 40, 41, 52 | 2N3394 |
| 62, 63 | 2N2694 |
| 73 | 2N3638 |
| 81 | 2N2646 |

| SCR numbers 98, 99 | 2N3669 |
|---|---|

| Resistor numbers: | Value |
|---|---|
| 26 | 100 ohm, 2 w. |
| 101, 103 | 15 ohm, .5 w. |
| 86 | 5K ohm, 5 w. |
| 32 | 10K ohm, .5 w. |
| 36 | 330K ohm, .5 w. |
| 37, 53, 67, 70 | 4.7K ohm, .5 w. |
| 87 | 330 ohm, .5 w. |
| 46 | 18K ohm, .5 w. |
| 44 | 15K ohm, .5 w. |
| 42, 71 | 2.2K ohm, .5 w. |
| 76, 80 | 3.3K ohm, .5 w. |
| 47, 48 | 22K ohm, .5 w. |
| 49, 54 | 1K ohm, .5 w. |
| 77 | 270 ohm, .5 w. |
| 64, 66 | 470 ohm, .5 w. |

| | Type |
|---|---|
| Lamps 91, 92, 93 | 222 |
| Pulse forming transformer | 90–2398 |

It will be understood that variations and modifications can be effected without departing from the spirit and scope of the novel concepts of this invention.

I claim as my invention:

1. A control circuit for controlling the speed of rotation of a dynamoelectric machine, comprising:

first means including mask means having one part movable in response to the rotation of the dynamoelectric machine for generating pulse signal information in response to the speed of rotation of the dynamoelectric machine;

said mask means comprising a fixed second part having a different number of light transmitting portions in a preselected ratio corresponding to a predetermined speed, circuit means connected to said first means for receiving said pulse signal information to develop a direct current voltage having an amplitude indicative of the frequency of said pulse said information; and second means including an oscillator circuit connected to said circuit means for receiving said direct current voltage to generate control signal oscillations having a frequency indicative of the amplitude of said direct current voltage, and further including switch means responsive to said control signal oscillations for delivering energizing current to the dynamoelectric machine, whereby the rotation of the dynamoelectric machine is maintained at a predetermined speed in response to said pulse signal information.

2. A control circuit for controlling the speed of rotation of a dynamoelectric machine according to claim 1 wherein said first means includes a light source and a light responsive means for receiving light from said light source to generate said pulse signal information in response thereto, and wherein said movable means includes a segmented element having alternate light transmitting portions and light blocking portions, said element arranged to receive light from said light source while in one position and transmit the light so received to said light responsive means, and for blocking light to said light responsive means while in another position, thereby generating said pulse signal information.

3. A control circuit for controlling the speed of rotation of a dynamoelectric machine according to claim 2 wherein said circuit means includes a one-shot multivibrator for developing square wave pulses having a constant pulse width and a variable repetition rate, said repetition rate being responsive to the frequency of said pulse signal information, and a detector circuit for detecting said square wave pulses to develop said direct current voltage.

4. A control circuit for controlling the speed of rotation of a dynamoelectric machine according to claim 3 wherein said circuit means further includes means for varying the potential of said direct current voltage developed in said detector circuit, thereby varying the frequency of said control signal oscillations to correspondingly change the speed of rotation of the dynamoelectric machine.

5. A control circuit for controlling the speed of rotation of a dynamoelectric machine according to claim 1 wherein said first means includes a light source, a photocell for receiving light from said light source, and wherein said movable means includes a segmented element having alternate light transparent portions and light blocking portions, said element positioned between said light source and said photocell to cause pulses of light to be sensed by said photocell in response to the movement of said element, thereby generating said pulse signal information.

6. A control circuit for controlling the speed of rotation of a dynamoelectric machine according to claim 5 wherein said circuit means includes a one-shot multivibrator for developing square wave pulses having a constant pulse width and a variable repetition rate, said repetition rate being responsive to the frequency of said pulse signal information, and a detector circuit for detecting said square wave pulses to develop said direct current voltage.

7. A control circuit for controlling the speed of rotation of a dynamoelectric machine according to claim 6 wherein said circuit means further includes means for varying the potential of said direct current voltage thereby varying the frequency of said control signal oscillations to correspondingly change the speed of rotation of the dynamoelectric machine.

8. A control circuit for controlling the speed of rotation of a dynamoelectric machine according to claim 1 wherein said first means includes a plurality of light sources, light responsive means for receiving light from certain ones of said light sources to generate said pulse signal information, and wherein said movable means includes a plurality of segmented elements, each of said segmented elements having alternate light transmitting portions and light blocking portions, the dimensions of the light transmitting portions and light blocking portions of each segmented element being different than that of the other segmented elements, each of said light sources arranged to transmit light onto a corresponding one of said segmented elements, and means for selectively energizing a desired one of said light sources, whereby the selected light source will cooperate with its associated segmented element to generate said pulse signal information.

9. A control circuit for controlling the speed of rotation of a dynamoelectric machine according to claim 8 wherein said circuit means includes a one-shot multivibrator for developing square wave pulses having a constant pulse width and a variable repetition rate, said repetition rate being inversely proportional to the frequency of said pulse signal information, and a detector circuit for detecting said square wave pulses to develop said direct current voltage.

10. A control circuit for controlling the speed of rotation of a dynamoelectric machine according to claim 8 wherein said circuit means further includes means for varying the potential of said direct current voltage, thereby varying the frequency of said control signal oscillation to correspondingly change the speed of rotation of said dynamoelectric machine.

11. A control circuit for controlling the speed of rotation of a dynamoelectric machine, comprising:
   first means including means movable in response to the rotation of the dynamoelectric machine for generating pulse signal information in response to the speed of rotation of the dynamoelectric machine;
   circuit means connected to said first means for receiving said pulse signal information to develop a direct current voltage having an amplitude indicative of the frequency of said pulse information; and
   second means including an oscillator circuit connected to said circuit means for receiving said direct current voltage to generate control signal oscillations having a frequency indicative of the amplitude of said direct current voltage, and further including switch means responsive to said control signal oscillations for delivering energizing current to the dynamoelectric machine, whereby the rotation of the dynamoelectric machine is maintained at a predetermined speed in response to said pulse signal information, said first means including a plurality of light sources, light responsive means for receiving light from certain ones of said light sources to generate said pulse signal information, and said movable means including a plurality of segmented elements, each of said segmented elements having alternate light transmitting portions and light blocking portions, the dimensions of the light transmitting portions and light blocking portions of each segmented element being different than that of the other segmented elements, each of said light sources arranged to transmit light onto a corresponding one of said segmented elements, and means for selectively energizing a desired one of said light sources,
   whereby the selected light source will cooperate with its associated segmented element to generate said pulse signal information,
   said switch means including first and second silicon controlled rectifiers each having anode, cathode and gate electrodes, the anode of said first silicon controlled rectifier being connected to the cathode of said second silicon controlled rectifier and the cathode of said first silicon controlled rectifier being connected to the anode of said second controlled rectifier, and said first and second silicon controlled rectifiers being connected in electrical series with the dynamoelectric machine, and triggering means connected to said gate electrode of each of said silicon controlled rectifiers for receiving said control signal oscillations to alternately render said first and second silicon controlled rectifiers conductive thereby energizing the dynamoelectric machine.

12. A control circuit for an AC motor having a stator and a rotor, comprising, in combination:
   a source of alternating current voltage;
   a transformer having a primary winding and first and second secondary windings, said primary winding connected to said source of alternating current voltage;
   a rectifier and filter circuit connected to said first secondary winding for developing therefrom a first direct current voltage;
   a full wave rectifier circuit connected to said second secondary winding of said transformer for developing half-wave pulses therefrom;
   means coupled to said rotor for rotation therewith to generate pulse signal information indicative of rotor speed;
   first circuit means connected to said rectifier and filter circuit, said first circuit means including a one-shot multivibrator for producing square wave pulses having a fixed pulse width and a variable pulse repetition rate, said repetition rate varying inversely with the frequency of said pulse signal information, a detector circuit for receiving said square wave pulses and developing therefrom a second direct current voltage which is proportional to said repetition rate;
   second circuit means including oscillatory means connected to said full wave rectifier circuit and to said detector circuit for generating control signal oscillations having a frequency equal to said half-wave pulses but displaced in phase in response to said second direct current voltage; and
   switch means connecting the AC motor to said source of alternating current voltage, said switch means being responsive to said control signal oscillations, thereby controlling the speed of rotation of the motor.

References Cited

UNITED STATES PATENTS

| | | | |
|---|---|---|---|
| 3,239,741 | 3/1966 | Rank | 318—313 |
| 3,268,788 | 8/1966 | Branco | 318—313 X |
| 2,769,949 | 11/1956 | Stratton | 318—312 |

ORIS L. RADER, Primary Examiner

T. LANGER, Assistant Examiner

U.S. Cl. X.R.

318—318